United States Patent [19]
Prechtel et al.

[11] Patent Number: 5,876,525
[45] Date of Patent: Mar. 2, 1999

[54] BOBBIN BODY AND PROCESS FOR PRODUCING THE SAME

[75] Inventors: Michael Prechtel, München; Davorin Lenarcic, Bad Wörishofen, both of Germany

[73] Assignee: Hilebrandt-Spolen-Bobbins GmbH, Bad Worishofen, Germany

[21] Appl. No.: 150,180

[22] PCT Filed: Apr. 2, 1993

[86] PCT No.: PCT/EP93/00828

§ 371 Date: Nov. 30, 1993

§ 102(e) Date: Nov. 30, 1993

[87] PCT Pub. No.: WO93/21352

PCT Pub. Date: Oct. 28, 1993

[30] Foreign Application Priority Data

Apr. 3, 1992 [DE] Germany .......................... 42 11 172.2

[51] Int. Cl.⁶ .............................. C22F 1/04; B65H 75/14
[52] U.S. Cl. ............................. 148/690; 29/34 R; 72/80;
72/177; 148/689; 148/691; 148/415; 148/437;
148/909; 242/118.7; 242/610.4; 242/610.5
[58] Field of Search ...................... 148/689, 690,
148/691, 415, 437, 909; 29/34 R; 72/80,
177; 242/118.7, 610.4, 610.5

[56] References Cited

U.S. PATENT DOCUMENTS 3,913,863 10/1975 O'Malley .............................. 242/118.7

FOREIGN PATENT DOCUMENTS 3805814 9/1988 Germany .
3908223 9/1990 Germany .
9206652 8/1992 Germany .

OTHER PUBLICATIONS

Patent Abstracts of Japan, vol. 016, No. 270 (M–1266) 17. Juni 1992 & JP, A, 4066230 (Nissan Motor Co) 2. März, 1992.

Database WPI, Section Ch, Week 7216, Derwent Publications Ltd., London, GB; Class FO2, AN 72–25737 & JP, B, 47012542 (Nakajo) 18. Apr. 1972.

Patent Abstracts of Japan, vol. 013, No. 545 (M–902) 6. Dezember 1989 & JP, A, 1224185 (Takashi Funabiki) 7. Sep. 1989.

Primary Examiner—David A. Simmons
Assistant Examiner—Robert R. Koehler
Attorney, Agent, or Firm—Gerald E. Linden

[57] ABSTRACT

In order to simplify the production of a nigh-resistance bobbin body made of an aluminum alloy, the following process steps are performed: (a) extruding or flow extruding an essentially cylindrical bobbin blank; (b) cutting the bobbin blank to a length including the desired bobbin body length plus an overlength sufficient to form end flanges on the bobbin body; (c) shaping end flanges at both ends of the bobbin body from the overlength portion; hardening the bobbin body; and age-hardening (aging) the bobbin body. Various process parameters are described.

17 Claims, 2 Drawing Sheets

BOBBIN BODY AND PROCESS FOR PRODUCING THE SAME

TECHNICAL FIELD OF THE INVENTION

The invention relates to bobbins and methods of making same and, more particularly, to a bobbin having a cylindrical aluminum alloy body and end flanges of greater diameter than the body, for receiving and winding materials such as synthetic yarn.

BACKGROUND OF THE INVENTION

A bobbin body for thread-form wound material is known from DE 3 908 223 C2, wherein two bobbin body halves of a light metal alloy are fixed together by a friction welded seam at their butted core tube ends. The bobbin body halves are made by flow extrusion, where however the shape of the bobbin body is set by the geometric limits determined by the flow extrusion process, since from a certain diameter of the bobbin flanges, the wall thickness of the end flanges compared with a relatively large diameter is very small so that inhomogeneities can occur in the bobbin body halves and reduce the strength of the bobbin body. The strength of the bobbin body has especial significance, since the end flanges of the bobbin body are pressed out from one another and are thus subjected to high stresses, especially in winding high strength elastic or synthetic yarns.

As well as this, bobbin bodies are known which are welded or screwed together from a plurality of parts, which however allow gaps to occur from bending out of the end flanges, in which the inner turns of the wound material engage and are thus firmly clamped. Moreover, cast bobbin bodies are also known, which are however not able to cope with the stresses which arise, particularly in the transition region between the winding body and the end flanges and thus can break. This danger exists even with bobbin bodies turned from solid material, since notch effects can result from the sharp transition in the corner region between the end flanges and the winding tube and the interrupted course of the fibers and can lead to fracture. This implementation is not suitable for long production runs on account of the costs of the high material usage and the long machining time.

SUMMARY OF THE INVENTION

Accordingly the invention is based on the object of providing a bobbin body and method of manufacture thereof, with which a higher strength of the bobbin body is obtained, at the same time with small production costs.

According to the invention, there is provided a method of making a bobbin body from an aluminum alloy, wherein the bobbin has a cylindrical winding body for receiving wound materials, especially synthetic yarn, and end flanges of greater diameter in comparison therewith, with the following method steps:

a) extrusion molding or flow extrusion molding a substantially cylindrical bobbin blank;

b) cutting the bobbin blank to the desired bobbin body length plus an excess for making the end flanges;

c) shaping both ends of the bobbin blank to the end flanges;

d) hardening the bobbin body; and e) aging (ageing) the bobbin body.

Further according to the invention, there is provided a bobbin body formed of aluminum alloy, wherein the bobbin body comprises:

a cylindrical winding body for reception of wound material, especially synthetic yarn, and end flanges with a greater diameter than the winding body, and characterized in that:

the bobbin body is made in one piece by simultaneous shaping of the two ends of a cylindrical bobbin blank.

An uninterrupted course of the fibers especially in the critical transition region from the winding body to the end flanges, is obtained from the unitary manufacture of the bobbin body, with shaping of the two ends of a substantially cylindrical bobbin blank, preferably simultaneously. From this results an especially high strength of the bobbin body. At the same time markedly reduced production costs are achieved from the formation of the bobbin body in one piece, since, in contrast to the state of the art, separate parts no longer have to be made and then have to be joined together in time-consuming manner. In addition there is a reduction of the achievable tolerances, since faulty position of the components relative to one another, for example errors in parallelism or axial errors, are avoided, so that the bobbin body can be made accurately to final measurements and with very small excess material for the final fine finishing by turning.

Further advantageous developments are the subject matter of the dependent claims.

BRIEF DESCRIPTION OF THE DRAWINGS

Four embodiments of the method of manufacture of a bobbin body are explained in more detail and described below with reference to the drawings, in which.

DESCRIPTION OF THE INVENTION

Figure 1:
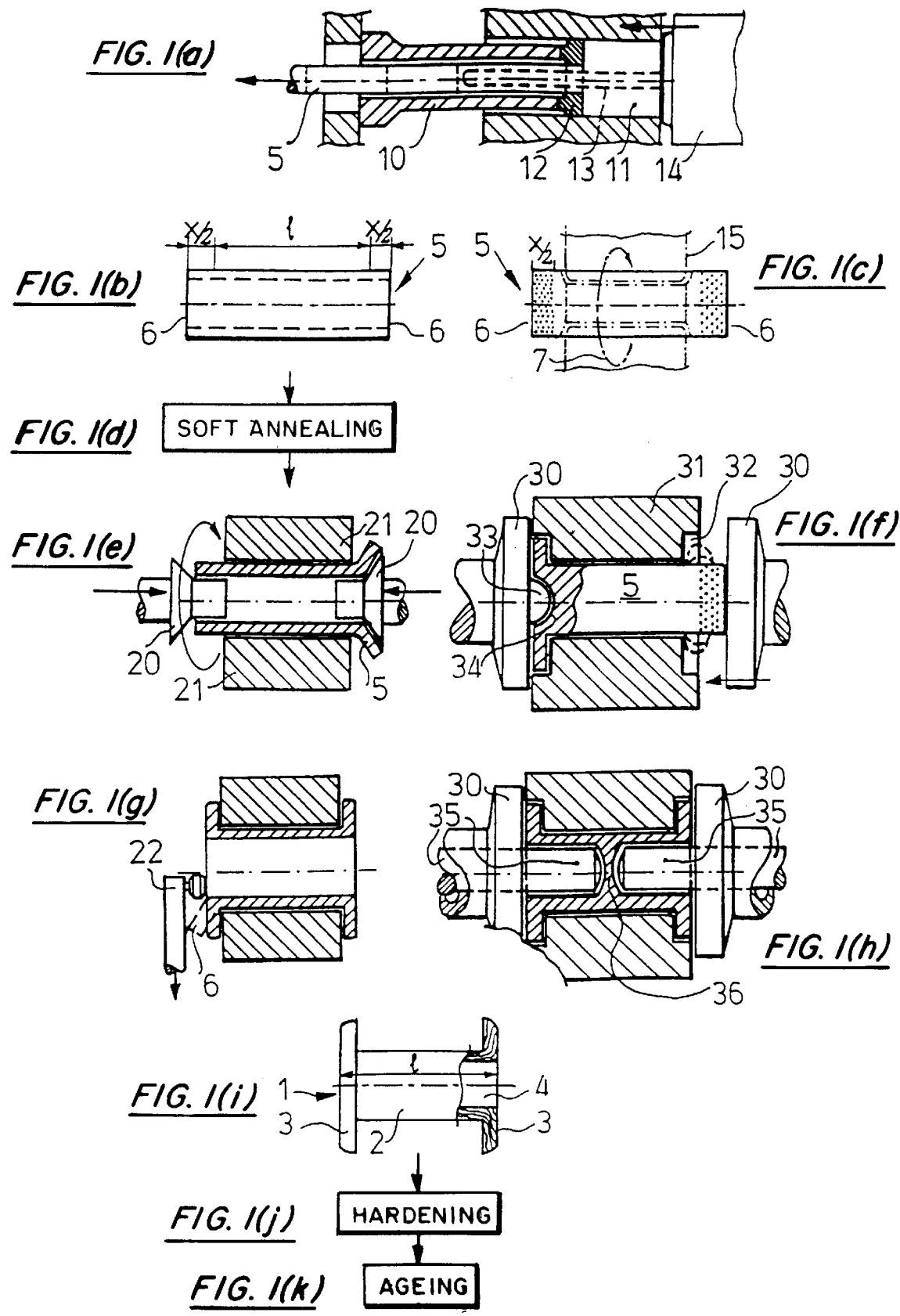
FIG. 1A–1K are diagrams of the sequence of operations of a bobbin body manufacture according to a first and a second embodiment of the invention.

The end product of the proposed method of manufacture is shown in FIG. 1I, namely a bobbin body 1 which consists essentially of a winding body 2 and two end flanges 3 at the ends. In order to mount the bobbin body 1 on suitable bearings, not shown, as well as for weight reduction, the bobbin body 1 has a central bore 4, preferably a through bore, as is shown in the right part of FIG. 1I, in sectional view. The bobbin body 1 has a length l and an uninterrupted run of the fibers, as is indicated in the sectional view in place of hatching. It is apparent from this that the course of the fibers of the starting material, preferably the aluminum alloy AlZnMgCu 0.5 (DIN 7022) is adapted to the geometric shape, especially in the critical transition region between the winding body 2 and the end flanges 3, and is not interrupted, in contrast to bobbin bodies turned from solid material.

A method of making such a bobbin body 1 is described in more detail below, with two alternative methods, especially cold forming by flanging (as shown in FIGS. 1A, 1B, 1D, 1E, 1G, 1I, 1J and 1K) and hot forming by forging (as shown in FIGS. 1A, 1C, 1F, 1H, 1I, 1J and 1K), where the initial and final method steps are however identical. In a first method step, shown in FIG. 1A, a cylindrical bobbin blank 5 in the form of a bar is made by means of a ram 10 from a pre-heated extrusion block 11, which is pressed through a die 12 on the front end of the ram 10. An indirect extrusion method is preferably used, wherein the ram 10 is made hollow, through which the extruded bar forming the bobbin blank 5 emerges. A homogeneous course of the fibers is obtained from this. The extruded bar is formed as solid material for the hot shaping technique, while a tubular bobbin blank 5 is required for the alternative cold forming technique. In order to produce this tubular bobbin blank 5 a mandrel 13 shown in broken lines is provided for the extrusion and projects into the die 12 and is mounted on a closure piece 14. In the extrusion the closure piece 14 together with the aluminum alloy forming the extrusion block 11, heated to about 360° to 420° C. are moved to the left against the ram 10, so that the extruded rod emerges as a tube.

In next steps, the bobbin blank 5, which is formed either as a tube (as shown in FIG. 1B) or as solid material (as shown in FIG. 1C), is then cut to the desired bobbin body length l, where however an excess amount of material required for forming the end flanges 3 corresponding to the excess x (half thereof x/2 at each end) is taken into account. If for example the bobbin body length l=150 mm, an excess of x=20 mm is taken into account for formation of the flanges (again dependent on their final diameter), so that the bobbin blank 5 is cut off approximately to a length of 170 mm. The ends 6 at the end faces of the bobbin blank 5 thus result by the parting of the extruded bar indicated by broken lines.

As is shown in method FIG. 1C in broken lines, the central region of the bobbin blank 5, which then forms the winding body 2, can be reduced in diameter by forging with forging tools 15, so that a dumb-bell shaped outer form results. In order to obtain as good an accuracy in measurements as possible through this, the bobbin blank 5 is rotated during the working by the opposed forging tools 15, as is indicated by the broken line arrow 7. This method with additional radial reduction in diameter is especially suitable for bobbin bodies which have end flanges 3 of specially large diameter compared with the diameter of the winding body 2. The thickened regions in the region of the ends (shown dotted here) serve to form the end flanges 3 after the upsetting in the axial direction. The axial length of these thickened regions is likewise so selected with an axial length of x/2 each that their volume corresponds to the volume of the end flanges 3 after the upsetting.

The shaping at room temperature by flanging the two ends 6 of the tubular bobbin blank 5 will first be described, as is represented in FIG. 1E and 1G. Before the shaping at room temperature the bobbin blank 5 is firstly annealed (as shown in FIG. 1D) free from stresses or soft annealed, where this is effected at approximately 340° to 400° C. for two to four hours, is then cooled at a small temperature reduction rate of 25° C./h to 200° to 250° C., is then maintained at this temperature for one to five hours before the soft annealed bobbin blank 5 is cooled to room temperature without further special precautions. The bobbin blank 5 heat treated in this way is then clamped in a jaw-formed clamping tool 21, which is rotatable and has an axial length corresponding to the bobbin body 1 minus the thickness of the two end flanges 3. While rotating the bobbin blank 5 a conical flanging tool 20 is then pressed on endwise at both ends 6, so that the ends 6 of the bobbin blank 5 are flared out at an angle of approximately 120°, as is indicated in the right drawing part. Since this flanging or spreading out of the ends 6 takes place in the soft annealed state, no hair cracks or the like are to be feared. Since the pressing on of the tools 20 is effected simultaneously and symmetrically, e.g. by hydraulic cylinders, the clamping tool 21 can be relatively lightly dimensioned, since the forces compensate.

With relatively small diameters of the end flanges 3 spreading out to 180° is also possible, thus to the final shape of the bobbin body 1. Preferably however the conically spread ends 6 (here shown only broken-lined FIG. 1G are rolled in a second shaping step by a rolling tool 22, again with rotation of the bobbin blank 5, into parallel alignment of the ends 6, whereby the outer edges of the end flanges 3 are pressed on to the clamping tool 21, so that precise parallel alignment of the two end flanges 3 is obtained. In addition, the outer surfaces of the bobbin body 1 are already smoothed by the rolling, so that final finishing of these surfaces by turning may be superfluous. Instead of the rolling, shaping by means of electromagnetic field can also be effected, where windings are embedded in the clamping tool 21, which draw in the conically shaped end region of the bobbin blank 5 against the end faces of the clamping tool 21.

After releasing the clamping tool 21 the initially described bobbin body 1 shown in FIGS. 1E and 1G results. This bobbin body is then hardened (see FIG. 1J) by heating to a temperature of 400° to 450° C. over a time of 25 minutes and then quenching in water, as well as aged (aging or ageing) (see FIG. 1K), where this heat treatment preferably comprises heating to 100° to 130° C. with a maintenance time of three to six hours, then raising the temperature to 130° to 160° C. with a maintenance time of six to ten hours and final cooling in air.

The shaping at forging temperature of preferably 360° to 420° C. will now be described for the bobbin blank 5, with respect to FIGS. 1F and 1H.

The bobbin blank 5 here has a substantially cylindrical cross-section but can however also be in the dumb-bell shape as described above, shown in broken lines. This bobbin blank 5 is held in a jaw-formed clamping tool 31 closed like a cavity die. In order to form the end flanges 3 this clamping tool 31 has disk-shaped recesses 32 at both ends, matched to the shape of the flanges, into which the excess material shown dotted according to the excess x is pressed by disk-shaped press tools 30 simultaneously at both ends of the clamping tool 31 (compare the bulging out shown in broken lines). The start of the pressing operation is shown in the right part of the drawing, the end of the shaping in the left part of the drawing. This pressing into the recess 32 can take place in a single stroke but also as short blows in the nature of forging. The disk-shaped pressing or forging tools 30 preferably have a boss 33 in their centers, which results in a cavity 34 in the finished bobbin body 1, serving for turning-in the bearing seats. Moreover, these bosses 33 facilitate improved diversion into the recess 32 in pressing together the disk-shaped press tools 30. As is shown in this representation, the bosses 33 can also have a greater axial length, so that a deeper cavity 34 results, which will correspond to the through bore 4 of the bobbin body 1 up as far as a central web 36. Substantial weight reduction of the winding body 2 results from this, as well as improved radial flow conditions into the recess 32 for forming the end flanges 3. In addition an impression tool 35 independent of the forging or pressing tools 30 can be provided, with a greater stroke than the forging or pressing tools. This results in the pressing in of the cavity 34 only taking place with the recess 32 closed, thus with application of the disk-shaped press or forging tool 30 on to the clamping tool 31, so that no material can escape.

After opening the clamping tool 31 there again results the bobbin body 1 shown in FIG. 1I, which is then hardened (see FIG. 1J) and aged (see FIG. 1K) in accordance with the preceding particulars.

Because of the illustrated method of manufacture for the bobbin body 1 there results an optimum course of the fibers and thus a high strength with at the same time reduced production costs and reduced production tolerances. The bobbin body thus produced only needs fine finishing by turning, where minimal amounts of metal have to be removed on account of the small manufacturing tolerances, especially in relation to the parallelism of the end flanges 3. A further speeding up of the method of manufacture results from this.

Figure 2:
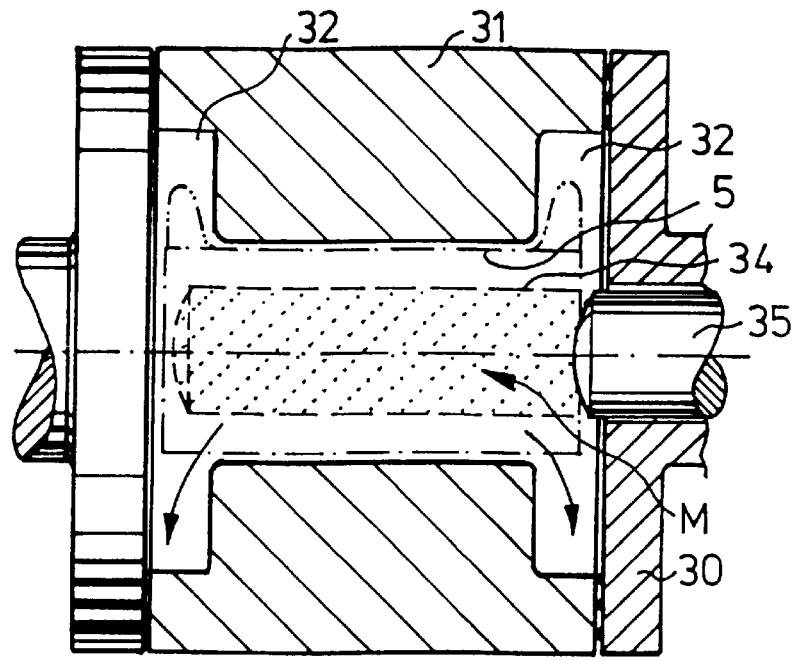
FIG. 2 is a cross-section through a mold for a third embodiment of the invention.

A modification of the previously described forging method is shown in FIG. 2. Instead of two impressing tools 35 there is only a single press or impressing die 35. The bobbin blank 5 (shown in chain-dotted lines) consists of solid material and is placed in the mold cavity with recesses 32 formed by the press tools 30 and 31. After closing this mold, the impressing die 35 is moved, here to the left, so that it forms a cavity 34 in the bobbin blank 5 shown broken-lined and this central material portion M (shown dotted) is forced out into the recesses 32 for practically simultaneous formation of the end flanges 3, as is indicated by the doubly chain-dotted bulging out. It should be noted that the volume pressed out by the impression die 35 corresponds to the volume of the end flanges 3 and thus likewise forms a kind of excess x corresponding to the showing in FIGS. 1B and 1C.

Figure 3:
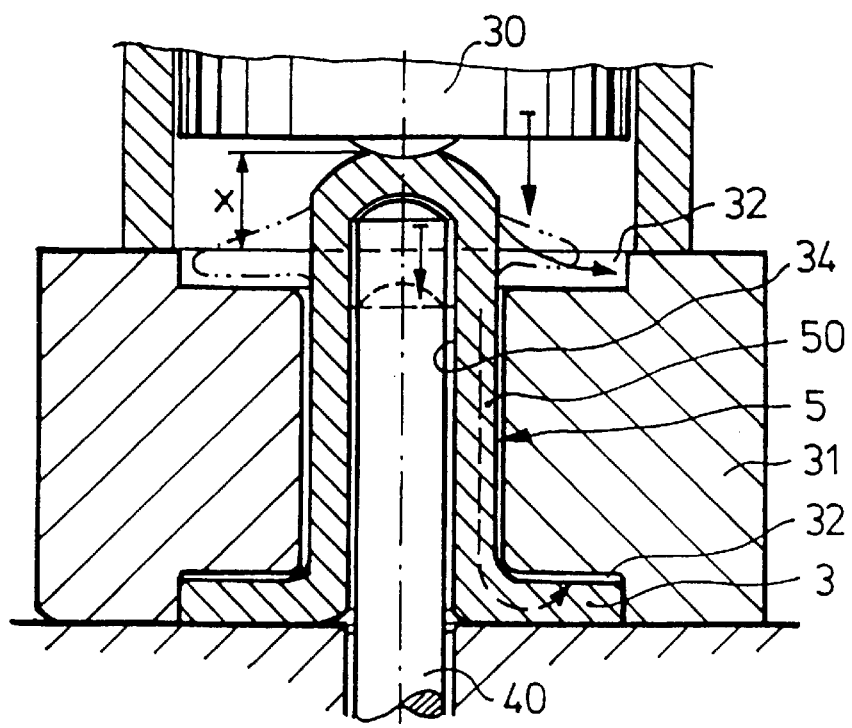
FIG. 3 is a cross-section through a mold for a fourth embodiment of the invention.

A further embodiment is shown in FIG. 3, in which a flow extrusion molded part 50 is used as the bobbin blank 5. However the blank with the end 6 conically spread by flanging (according to FIG. 1, step c, left column) can also be placed in the mold. It is important in this that the end flange 3 here at the bottom only has to be pre-formed coarsely, since the final shape of the bobbin body is produced by the compression with the press tool 30. On the one hand a here cap-shaped upwardly extending excess x is pressed into the recess 32 and on the other hand the pressure is also transmitted to the lower end flange 3 (compare the broken line arrow), so that both recesses 32 are filled up for simultaneous formation of precisely dimensioned end flanges. A mandrel 40 is introduced into the central cavity 34 which sinks with the sinking press tool 30 and thereby prevents material compressed from above being able to deflect inwardly.

What is claimed is:

1. A method of making a bobbin from an aluminum alloy, wherein the bobbin has a cylindrical winding body for receiving wound materials, especially synthetic yarn, and end flanges of greater diameter than the bobbin body, the method comprising the following sequence of steps:
   a) extrusion molding a substantially cylindrical bobbin blank having two ends;
   b) cutting the bobbin blank to a length which equals the sum of a desired bobbin body length plus an excess length at both ends of the bobbin blank, the excess length being sufficient to shape an end flange at each end of the bobbin body;
   c) shaping both ends of the bobbin blank to form the end flanges;
   d) hardening the bobbin body; and
   e) aging the bobbin body.

2. A method according to claim 1, wherein:
   the molding step (a) is performed as an indirect extrusion molding process, wherein a hollow plunger is provided, through which the bobbin blank emerges as a bar.

3. A method according to claim 1, wherein:
   the extrusion molding step (a) is effected at an elevated temperature of from 360° C. to 420° C.

4. A method according to claim 1, wherein:
   the bobbin blank is of tubular form;
   the shaping step (c) is effected at room temperature by flanging both ends of the bobbin blank; and
   further comprising:
   prior to flanging the bobbin blank, soft annealing the bobbin blank.

5. A method according to claim 4, wherein:
   the soft annealing is effected at an elevated temperature of from 340° C. to 400° C. for a time period of from two to four hours,
   after soft-annealing, the bobbin blank is cooled at a maximum temperature reduction rate of 250° C./h to a lesser temperature of from 200° C. to 250° C.,
   after cooling the bobbin blank, it is then maintained at the lesser temperature for a time period of from one to five hours, and
   after maintaining the bobbin blank at the lesser temperature for from one to five hours, the bobbin blank is finally cooled to room temperature.

6. A method according to claim 4, wherein:
   the flanging of the ends is effected with conically shaped, opposed flanging tools with rotary movement of the bobbin blank gripped in a clamp tool.

7. A method according to claim 6, further comprising: in the shaping step, the shaped end flanges are rolled by pressing the end flanges at right angles on to the clamp tool.

8. A method according to claim 1, wherein:
   the bobbin blank is of solid cross-section; and
   the shaping step (c) is effected at a forging temperature on the bobbin blank, the ends of which are upset over the excess length at both ends by forging tools having recesses in the desired shape of the end flanges.

9. A method according to claim 8, wherein:
   the shaping step (c) is effected at an elevated temperature of from 360° C. to 420° C.

10. A method according to claim 8, wherein:
    in the shaping step (c), a recess is impressed into the ends forming the end flanges of the bobbin blank by an impressing tool.

11. A method according to claim 10, wherein:
    the impressing tool has a greater stroke than the forging.

12. A method according to claim 8, wherein:
    before shaping the end flanges, a central region of the bobbin blank forming the bobbin body is reduced in diameter by a forging process with radially engaging forging tools into a dumb-bell shaped body.

13. A method according to claim 12, wherein:
    the bobbin blank is rotated during the forging process.

14. A method according to claim 1, wherein:
    the hardening step (d) is effected at an elevated temperature of from 400° C. to 450° C. for a time period of 25 minutes, whereafter the bobbin body is quenched in water.

15. A method according to claim 1, wherein:
    the aging step (e) is effected at an elevated temperature of 100° C. to 130° C. for a time period of from three to six hours,
    after the aging of the bobbin body for three to six hours, the temperature is raised to an elevated temperature of from 130° C. to 160° C. and is maintained at that temperature for a time period of from six to ten hours, and
    after raising the temperature of the bobbin body for six to ten hours, the bobbin body is cooled in air.

16. A bobbin comprising:

a cylindrical winding body formed of aluminum alloy and having two ends; and two end flanges, one at each end of the bobbin body and formed integrally therewith so that the bobbin is one piece of material;

wherein:

the winding body is formed of a solid piece of aluminum alloy and has cavities extending into the ends thereof, through the end flanges.

17. A bobbin comprising:

a cylindrical winding body formed of aluminum alloy and having two ends; and two end flanges, one at each end of the bobbin body and formed integrally therewith so that the bobbin is one piece of material;

wherein:

the bobbin is formed initially as a flow extruded part with a cavity extending therethrough, and the end flanges are forged.

* * * * *